US009787444B2

(12) United States Patent
Ellenbeck et al.

(10) Patent No.: US 9,787,444 B2
(45) Date of Patent: Oct. 10, 2017

(54) ENHANCED NODE B AND METHODS FOR NETWORK ASSISTED INTERFERENCE CANCELLATION WITH REDUCED SIGNALING (71) Applicant: Intel IP Corporation, Santa Clara, CA (US)

(72) Inventors: Jan Ellenbeck, Munich (DE); Sabine Roessel, Munich (DE); Bernhard Raaf, Neuried (DE); Thorsten Clevorn, Munich (DE); Stefan Franz, Munich (DE); Alexei Davydov, Nizhny Novgorod (RU)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/015,348

(22) Filed: Feb. 4, 2016

(65) Prior Publication Data
US 2016/0226600 A1    Aug. 4, 2016

Related U.S. Application Data (63) Continuation of application No. 14/134,461, filed on Dec. 19, 2013, now Pat. No. 9,264,191.
(Continued)

(51) Int. Cl.
*H04B 15/00*    (2006.01)
*H04L 5/00*    (2006.01)
(Continued)

(52) U.S. Cl.
CPC ........... *H04L 5/0007* (2013.01); *H04B 15/00* (2013.01); *H04J 11/00* (2013.01); *H04L 5/0005* (2013.01);
(Continued)

(58) Field of Classification Search
CPC ............... H04L 5/0073; H04L 25/0328; H04L 25/03305; H04L 1/0041; H04L 1/0045;
(Continued)

(56) References Cited

U.S. PATENT DOCUMENTS 6,275,543 B1    8/2001   Petrus et al.
8,031,105 B2   10/2011   Stayton
(Continued)

FOREIGN PATENT DOCUMENTS

CN    101411236 A    4/2009
CN    101836491 A    9/2010
(Continued)

OTHER PUBLICATIONS

"3rd Generation Partnership Project; Technical Specification Group Radio Access Network; Evolved Universal Terrestrial Radio Access (E-UTRA); Multiplexing and channel coding (Release 11)", 3GPP TS 36.212 V11.3.0, (Jun. 2013), 84 pgs.
(Continued)

*Primary Examiner* — Khanh C Tran
(74) *Attorney, Agent, or Firm* — Schwegman Lundberg & Woessner, P.A.

(57) ABSTRACT

Embodiments of an enhanced node B (eNB) and methods for network-assisted interference cancellation with reduced signaling in a 3GPP LTE network are generally described herein. In some embodiments, the number of transmission options is reduced by introducing a smaller signaling codebook. In some embodiments, higher-layer feedback from the UE to the eNodeB is established to inform the eNB about certain NA-ICS capabilities of the UE. In some embodiments, the number of signaling options is reduced by providing only certain a priori information. In some embodiments, correlations in the time and/or frequency domain are exploited for reducing the signaling message. In some
(Continued)

embodiments, differential information is signaled in the time and/or frequency domain for reducing the signaling message.

22 Claims, 3 Drawing Sheets

Related U.S. Application Data (60) Provisional application No. 61/843,826, filed on Jul. 8, 2013.

(51) Int. Cl.
| | |
|---|---|
| H04W 48/16 | (2009.01) |
| H04W 72/08 | (2009.01) |
| H04W 28/04 | (2009.01) |
| H04W 56/00 | (2009.01) |
| H04W 84/18 | (2009.01) |
| H04W 28/08 | (2009.01) |
| H04W 40/24 | (2009.01) |
| H04W 80/04 | (2009.01) |
| H04W 88/02 | (2009.01) |
| H04W 8/00 | (2009.01) |
| H04J 11/00 | (2006.01) |
| H04W 72/04 | (2009.01) |
| H04W 72/12 | (2009.01) |
| H04W 84/04 | (2009.01) |

(52) U.S. Cl.
CPC ........... *H04L 5/005* (2013.01); *H04L 5/0048* (2013.01); *H04L 5/0073* (2013.01); *H04W 8/005* (2013.01); *H04W 28/048* (2013.01); *H04W 28/08* (2013.01); *H04W 40/246* (2013.01); *H04W 48/16* (2013.01); *H04W 56/002* (2013.01); *H04W 72/044* (2013.01); *H04W 72/0413* (2013.01); *H04W 72/082* (2013.01); *H04W 72/1215* (2013.01); *H04W 80/04* (2013.01); *H04W 84/18* (2013.01); *H04W 88/02* (2013.01); *H04W 84/042* (2013.01); *Y02B 60/50* (2013.01)

(58) Field of Classification Search
CPC . H04L 25/03006; H04J 11/005; H04J 11/004; H04J 11/0073; H04J 11/0076; H04J 11/0079; H04B 7/0626; H04B 7/0417; H04B 7/0632

See application file for complete search history.

(56) References Cited

U.S. PATENT DOCUMENTS

| | | | |
|---|---|---|---|
| 9,264,191 | B2 | 2/2016 | Ellenbeck et al. |
| 9,270,425 | B2 | 2/2016 | Xue et al. |
| 9,479,298 | B2 | 10/2016 | Raaf et al. |
| 9,564,955 | B2* | 2/2017 | Lee ..................... H04W 76/046 |
| 9,742,531 | B2 | 8/2017 | Raaf et al. |
| 2008/0316935 | A1 | 12/2008 | Bala et al. |
| 2009/0264142 | A1 | 10/2009 | Sankar et al. |
| 2009/0305636 | A1 | 12/2009 | Hagerman et al. |
| 2009/0323838 | A1 | 12/2009 | Ho et al. |
| 2010/0054114 | A1 | 3/2010 | Li et al. |
| 2010/0074347 | A1 | 3/2010 | Lomnitz et al. |
| 2010/0087149 | A1 | 4/2010 | Srinivasan et al. |
| 2010/0087221 | A1 | 4/2010 | Srinivasan et al. |
| 2010/0303034 | A1 | 12/2010 | Chen et al. |
| 2011/0274207 | A1 | 11/2011 | Khojastepour et al. |
| 2011/0305213 | A1* | 12/2011 | Lohr ..................... H04L 1/1887 370/329 |
| 2011/0312319 | A1 | 12/2011 | Lindoff et al. |
| 2012/0076100 | A1 | 3/2012 | Noh et al. |
| 2012/0115521 | A1 | 5/2012 | Tong et al. |
| 2012/0120924 | A1 | 5/2012 | Montojo et al. |
| 2012/0155414 | A1 | 6/2012 | Noh et al. |
| 2012/0201134 | A1 | 8/2012 | Wang Helmersson et al. |
| 2012/0257568 | A1 | 10/2012 | Cai et al. |
| 2012/0275402 | A1 | 11/2012 | Prasad et al. |
| 2013/0044697 | A1 | 2/2013 | Yoo et al. |
| 2013/0089040 | A1 | 4/2013 | Tabet et al. |
| 2013/0114451 | A1 | 5/2013 | Al-Dhahir et al. |
| 2013/0148754 | A1 | 6/2013 | Tee et al. |
| 2013/0201848 | A1 | 8/2013 | Kazmi et al. |
| 2013/0265955 | A1 | 10/2013 | Kim et al. |
| 2013/0272250 | A1 | 10/2013 | Shimezawa et al. |
| 2013/0294368 | A1 | 11/2013 | Bendlin et al. |
| 2013/0343215 | A1 | 12/2013 | Li et al. |
| 2014/0092882 | A1 | 4/2014 | Sankar et al. |
| 2014/0153510 | A1 | 6/2014 | Gomadam et al. |
| 2014/0233407 | A1 | 8/2014 | Pourahmadi et al. |
| 2014/0293890 | A1* | 10/2014 | Davydov ............. H04L 5/0085 370/329 |
| 2014/0301303 | A1 | 10/2014 | Roman et al. |
| 2014/0334402 | A1 | 11/2014 | Chen et al. |
| 2014/0362769 | A1* | 12/2014 | Chen .................... H04J 11/0053 370/328 |
| 2015/0003343 | A1 | 1/2015 | Li et al. |
| 2015/0009903 | A1 | 1/2015 | Xue et al. |
| 2015/0009948 | A1 | 1/2015 | Raaf et al. |
| 2015/0009964 | A1 | 1/2015 | Ellenbeck et al. |
| 2015/0256280 | A1* | 9/2015 | Park ....................... H04J 11/005 370/329 |
| 2015/0365154 | A1* | 12/2015 | Davydov ............. H04B 7/024 370/329 |
| 2016/0080963 | A1* | 3/2016 | Marinier .............. H04L 5/0053 370/252 |
| 2017/0041109 | A1 | 2/2017 | Raaf et al. |

FOREIGN PATENT DOCUMENTS

| | | |
|---|---|---|
| CN | 102017583 A | 4/2011 |
| CN | 102369673 A | 3/2012 |
| CN | 103002581 A | 3/2013 |
| CN | 103067966 A | 4/2013 |
| CN | 103188056 A | 7/2013 |
| CN | 105264797 A | 1/2016 |
| CN | 105359438 A | 2/2016 |
| CN | 105409146 A | 3/2016 |
| CN | 106059702 A | 10/2016 |
| EP | 2579661 A1 | 4/2013 |
| EP | 2592763 A2 | 5/2013 |
| HK | 1220052 A1 | 4/2017 |
| HK | 1221083 A1 | 5/2017 |
| HK | 1222482 A1 | 6/2017 |
| KR | 1020110080116 A | 7/2011 |
| KR | 1020120123247 A | 11/2012 |
| WO | WO-2010050689 A2 | 5/2010 |
| WO | WO-2011020062 A2 | 2/2011 |
| WO | WO-2011083945 A2 | 7/2011 |
| WO | WO-2011085195 A1 | 7/2011 |
| WO | WO-2011124028 A1 | 10/2011 |
| WO | WO-2012075387 A1 | 6/2012 |
| WO | WO-2012090851 A1 | 7/2012 |
| WO | WO-2015006218 A1 | 1/2015 |
| WO | WO-2015006229 A1 | 1/2015 |
| WO | WO-2015006289 A1 | 1/2015 |

OTHER PUBLICATIONS

"3rd Generation Partnership Project; Technical Specification Group Radio Access Network; Evolved Universal Terrestrial Radio Access (E-UTRA); Physical Channels and Modulation (Release 11)", 3GPP TS 36.211 V11.3.0 (Jun. 2013), 108 pgs.

"U.S. Appl. No. 14/109,112, Non Final Office Action mailed Jan. 21, 2016", 16 pgs.

"U.S. Appl. No. 14/134,461, Non Final Office Action mailed Jun. 19, 2015", 10 pgs.

(56) References Cited

OTHER PUBLICATIONS

"U.S. Appl. No. 14/134,461, Notice of Allowance mailed Oct. 9, 2015", 10 pgs.
"U.S. Appl. No. 14/134,461, Response filed Aug. 21, 2015 to Non Final Office Action mailed Jun. 19, 2015", 12 pgs.
"U.S. Appl. No. 14/135,296, Non Final Office Action mailed May 21, 2015", 10 pgs.
"U.S. Appl. No. 14/135,296, Notice of Allowance mailed Oct. 14, 2015", 10 pgs.
"U.S. Appl. No. 14/135,296, Response filed Aug. 21, 2015 to Non Final Office Action mailed May 21, 2015", 8 pgs.
"Application Serial No. PCT/US2014/045579, International Preliminary Report on Patentability mailed Jan. 21, 2016", 6 pgs.
"Application Serial No. PCT/US2014/045690, International Preliminary Report on Patentability mailed Jan. 21, 2016", 7 pgs.
"International Application Serial No. PCT/US2014/045579, International Search Report mailed Nov. 18, 2014", 4 pgs.
"International Application Serial No. PCT/US2014/045579, Written Opinion mailed Nov. 18, 2014", 4 pgs.
"International Application Serial No. PCT/US2014/045599, International Search Report mailed Nov. 18, 2014", 3 pgs.
"International Application Serial No. PCT/US2014/045599, Written Opinion mailed Nov. 18, 2014", 4 pgs.
"International Application Serial No. PCT/US2014/045690, International Search Report mailed Oct. 28, 2014", 3 pgs.
"International Application Serial No. PCT/US2014/045690, Written Opinion mailed Oct. 28, 2014", 5 pgs.
"Technical Specification Group Radio Access Network; Evolved Universal Terrestrial Radio Access (E-UTRA) and Evolved Universal Terrestrial Radio Access Network (E-UTRAN)", 3GPP TS 36.300 V10.2.0, (Dec. 2010), 200 pgs.
"Technical Specification Group Radio Access Network; Evolved Universal Terrestrial Radio Access (E-UTRA) and Evolved Universal Terrestrial Radio Access Network (E-UTRAN)", 3GPP TS 36.300 V12.0.0, (Dec. 2013), 208 pgs.
"Technical Specification Group Radio Access Network; Evolved Universal Terrestrial Radio Access (E-UTRA) and Evolved Universal Terrestrial Radio Access Network (E-UTRAN);", 3GPP TS 36.300 V8.4.0, (Mar. 2008), 126 pgs.
"Technical Specification Group Radio Access Network; Evolved Universal Terrestrial Radio Access (E-UTRA); Physical channels and modulation", 3GPP TS 36.211 V11.6.0, (Sep. 2014), 120 pgs.
"U.S. Appl. No. 15/332,602, Notice of Allowance mailed Apr. 12, 2017", 14 pgs.
"Chinese Application Serial No. 201480031473.6, Response filed Mar. 6, 2017 to Office Action mailed Oct. 25, 2016", (W/ English Claims), 12 pgs.
"European Application Serial No. 14823752.2, Extended European Search Report mailed Mar. 13, 2017", 11 pgs.
"European Application Serial No. 16169847.7, Response filed Mar. 21, 2017 to Communication Pursuant to Article 94(3) EPC mailed Oct. 21, 2016", 10 pgs.
Erik, Dahlman, et al., "4G LTE/LTE-Advanced for Mobile Broadband—Chapter 10", (Mar. 29, 2011), 61 pgs.
"U.S. Appl. No. 14/109,112, Corrected Notice of Allowance mailed Jun. 28, 2016", 2 pgs.
"U.S. Appl. No. 14/109,112, Notice of Allowance mailed Jun. 21, 2016", 9 pgs
"U.S. Appl. No. 14/109,112, Response filed May 23, 2016 to Non Final Office Action mailed Jan. 21, 2016", 13 pgs.
"Chinese Application Serial No. 201480031473.6, Office Action mailed Oct. 25, 2016", w/ English Translation, 16 pgs.
"Chinese Application Serial No. 201480031508.6, Office Action mailed Sep. 14, 2016", W/ English Translation, 13 pgs.
"Chinese Application Serial No. 201480031508.6, Response filed Feb. 3, 2017 to Office Action mailed Sep. 14, 2016", w/ English Translation, 11 pgs.
"Discussion on scenarios and applications of NAICS", 3GPP Draft; RI-131039 NAICS High Level, 3rd Generation Partnership Project (3GPP), Mobile Competence Centre ; 650, Route Des Lucioles ; F-06921 Sophia-Antipolis Cedex ; France; [Online] retrieved from the internet: <URL:http://www.3gpp.org/ftp/tsgran/WGIRLI/TSGRI_72b/Docs/>, (May 5, 2013), 1-15.
"European Application Serial No. 14822483.5, Extended European Search Report mailed Jan. 2, 2017", 10 pgs.
"European Application Serial No. 14822925.5, Extended European Search Report mailed Feb. 17, 2017", 10 pgs.
"European Application Serial No. 16169847.7, Communication Pursuant to Article 94(3) EPC mailed Oct. 21, 2016", 7 pgs.
"European Application Serial No. 16169847.7, Extended European Search Report mailed Oct. 5, 2016", 5 pgs.
"Evaluation assumptions for network-assisted IC", Mediatek Inc, 3GPP Draft; R1-131191 Simulation Assumption for NAIC, 3rd Generation Partnership Project (3GPP), Mobile Partnership Project (3GPP), Mobile Competence Centre ; 650, Route Des, [Online] retrieved from the internet: <http://www.3gpp.org/ftp/tsg_ran/WG1RL1/TSGR172b/Docs/>, (Apr. 6, 2013), 6 pgs.
"Interference Issues for Supporting Backward Compatibility in TDD eIMTA Systems", OGPP TSG RAN WGI Meeting #72bis Chicago, (Apr. 2013) 1-20.
"International Application Serial No. PCT/US2014/045599, International Preliminary Report on Patentablility mailed Jan. 21, 2016", 6 pgs.
"LTE in a Nutshell: The Physical Layer", Telesystem Innovations Inc. White Paper, [Online]. Retrieved from the Internet: <URL: http://www.tsiwireless.com/docs/whitepapers/LTE%20in%20a120Nutshell*20-420Physical%20Layer.pdf>, (2010), 18 pgs.
"Remaining Issues for CSI Processes in TM10 with Codebook Subset Restriction", 3GPP Draft; RI-124869 Remaining Issues for CSI Processes in TM10 With Codebook Subset-V4, 3rd Generation Partnership Project (3GPP), Mobile Competence Centre 650, Route Des Lucioles ; F-06921 Sophia, [Online] retrieved from the internet:<URL:http://www.3gpp.org/ftp/tsg_ran/WGI_RLI/TSGRI_71/Docs/>, (Nov. 2, 2012), 1-15.
"Views and evaluation on the potential gain of NAICS Receivers", 3GPP Draft; R4-132507 Views and Evaluation on the Potential Gain of NAICS Receivers Final, 3rd Generation Partnership Project (3GPP), Mobile Competence Centre ; 650, Route Des Lucioles ; F-06921 Sophi, [Online] retrieved from the internet: <http://www.3gpp.org/ftp/tsg_ran/WG4_Radio/TSGR4_67/Docs/>, (May 13, 2013), 1-15.
"Views on network-assisted interference cancellation and suppression", 3GPP Draft; R1-131633, 3rd Generation Partnership Project (3GPP), Mobile Competence Centre ; 650, Route Dec Lucioles F-06921 Sophia-Antipolis Cedex; France vol. RAN WG1, No. Chicago, USA; Apr. 15, 2013-Apr. 19, 2013, XP050697420, [Online] retrieved from the internet: <http://www.3gpp.org/ftp/tsgran/WG1RL1/TSGR172b/Docs/>, (Apr. 10, 2013), 9 pgs.
Ericsson, "Final Details on Codebook Subset Restriction", 3GPP Draft; R1-083745, 3rd Generation Partnership Project (3GPP), Mobile Competence Centre ; 650, Route Des Lucioles ; F-06921 Sophia-Antipolis Cedex ; France, (Sep. 24, 2008).
"U.S. Appl. No. 15/332,602, Corrected Notice of Allowance dated May 11, 2017", 2 pgs.
"Chinese Application Serial No. 201480031473.6, Office Action dated Jun. 2, 2017", (W/ English Translation), 7 pgs.

* cited by examiner

's mobile network and provides extra
ENHANCED NODE B AND METHODS FOR NETWORK ASSISTED INTERFERENCE CANCELLATION WITH REDUCED SIGNALING

PRIORITY CLAIM

This application is a continuation of U.S. patent application Ser. No. 14/134,461, filed Dec. 19, 2013, now issued as U.S. Pat. No. 9,264,191, which claims the benefit of priority under 35 USC 119(e) to U.S. Provisional Patent Application Ser. No. 61/843,826, filed Jul. 8, 2013, each of which is incorporated herein by reference in its entirety.

TECHNICAL FIELD

Embodiments pertain to wireless communications. Some embodiments relate to interference cancellation including network assisted interference cancellation in 3GPP-LTE networks.

BACKGROUND

Inter-cell, as well as intra-cell, co-channel interference mitigation is one of the most critical tasks of the long term evolution (LTE) user equipment (UE) receiver in order to optimize downlink (DL) throughput and to minimize radio link failures. The type of interference a UE experiences may vary from Physical Resource Block (PRB) to PRB as well as from Transmission Time Interval (TTI) to TTI. Furthermore, the type of interference experienced by a UE depends on the type of allocations that UEs in the neighbor cells received from their serving enhanced node B (eNB). Conventional interference mitigation techniques do not efficiently address these types of interference.

Thus, there are general needs for improved interference mitigation techniques in an LTE network. There are general needs for more efficient interference mitigation techniques in an LTE network.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
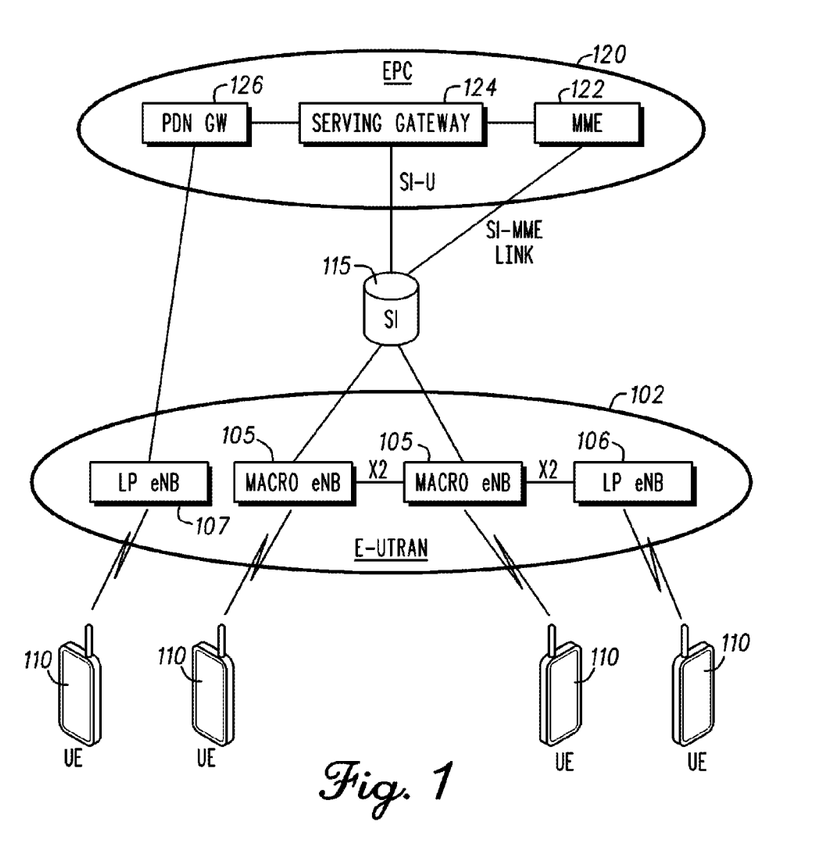
FIG. 1 shows a portion of an end-to-end network architecture of an LTE (long term evolution) network with various components of the network in accordance with embodiments.

FIG. 1 shows a portion of an end-to-end network architecture of a LTE network with various components of the network in accordance with embodiments. The network comprises a radio access network (e.g., as depicted, the E-UTRAN or evolved universal terrestrial radio access network) 102 and the core network (EPC) 120 coupled together through an S1 interface 115. (Note that for convenience and brevity sake, only a portion of the core network, as well as the RAN, is shown.

The core (EPC) 120 includes mobility management entity (MME) 122, serving gateway (serving GW) 124, and packet data network gateway (PDN GW) 126. The RAN 102 includes macro base stations (also referred to as macro eNodeB or eNB) 105, low power (LP) base stations (or LP eNBs) 106, 107, and UEs (user equipment or mobile terminals) 110.

The MME is similar in function to the control plane of legacy Serving GPRS Support Nodes (SGSN). It manages mobility aspects in access such as gateway selection and tracking area list management. The serving GW 124 terminates the interface toward the RAN, and routes data packets between the RAN and core network. In addition, it may be a local mobility anchor point for inter-eNode-B handovers and also may provide an anchor for inter-3GPP mobility. Other responsibilities may include lawful intercept, charging, and some policy enforcement. The Serving GW and the MME may be implemented in one physical node or separate physical nodes. The PDN GW terminates an SGi interface toward the packet data network (PDN). It routes data packets between the EPC and the external PDN, and may be a key node for policy enforcement and charging data collection. It may also provide an anchor point for mobility with non-LTE accesses. The external PDN may be any kind of IP network, as well as an IP Multimedia Subsystem (IMS) domain. The PDN GW and the Serving GW may be implemented in one physical node or separated physical nodes.

The eNode-B (macro and micro) terminates the air interface protocol and is usually (if not always) the first point of contact for a UE 110. In some embodiments, an eNode-B may fulfill various logical functions for the RAN including but not limited to RNC (radio network controller functions) such as radio bearer management, uplink and downlink dynamic radio resource management and data packet scheduling, and mobility management.

The S1 interface is the interface that separates the RAN and the EPC. It is split into two parts: the S1-U, which carries traffic data between the eNode-B and the Serving GW, and the S1-MME, which is a signaling interface between the eNode-B and the MME. The X2 interface is the interface between eNode-Bs (at least between most, as will be addressed below regarding micro eNBs). The X2 interface comprises two parts, the X2-C and X2-U. The X2-C is the control plane interface between eNode-Bs, while the X2-U is the user plane interface between eNode-Bs.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNode-B for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, LP eNB 107 may be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB 106 may be implemented with a picocell eNB since it is coupled to a macro eNB via an X2 interface. Picocell eNBs or other LP eNBs for that matter) may incorporate some or all functionality of a macro eNB. In some cases, this may be referred to as an access point base station or enterprise femtocell.

In accordance with embodiments, the eNBs may be arranged for providing network-assistance (NA) interference cancellation signaling (ICS) (NA-ICS) to UEs 110 for coordination of interference mitigation, interference cancellation (IC) or for performing interference suppression (IS). In some embodiments, the number of transmission options is reduced by introducing a smaller signaling codebook. In some embodiments, higher-layer feedback from the UE to the eNodeB is established to inform the eNB about certain NA-ICS capabilities of the UE. In some embodiments, the number of signaling options is reduced by providing only certain a priori information. In some embodiments, correlations in the time and/or frequency domain are exploited for reducing the signaling message. In some embodiments, differential information is signaled in the time and/or frequency domain for reducing the NA-ICS message. These embodiments are discussed in more detail below. In some embodiments, an eNB may include physical layer circuitry and processing circuitry for providing network assistance to UEs 110 for coordination of interference mitigation as discussed herein.

Figure 2:
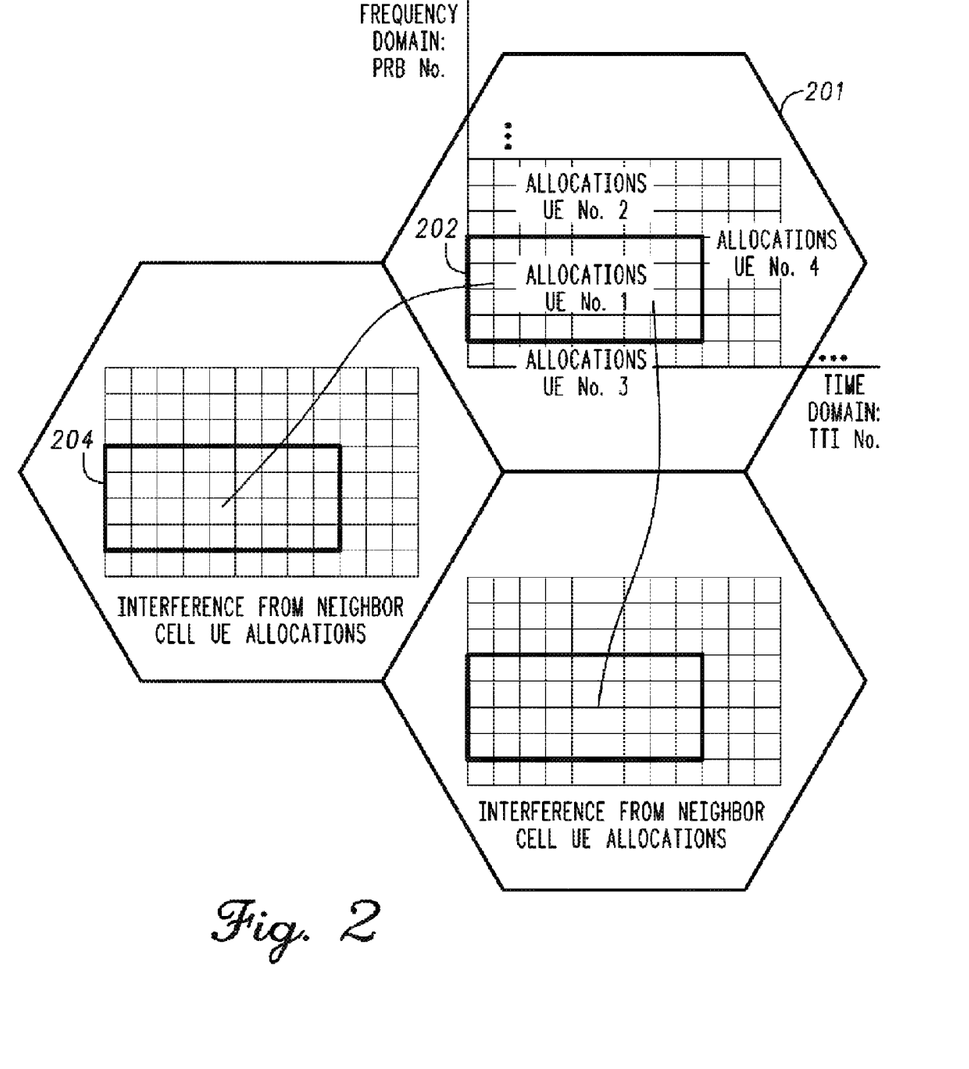
FIG. 2 illustrates interference variance from PRB-to-PRB as well as from TTI-to-TTI, in accordance with some embodiments.

FIG. 2 illustrates how the type of interference varies from PRB-to-PRB as well as from TTI-to-TTI, in accordance with some embodiments. As mentioned above, inter-cell, as well as intra-cell, co-channel interference mitigation is one of the more critical tasks of a UE receiver in order to optimize downlink (DL) throughput and to minimize radio link failures. When optimizing UE receiver performance or when trading off performance against UE receiver power consumption and/or UE cost, mitigation of co-channel interference will benefit from network assistance. In these embodiments, the LTE network may provide side information or coordination or both in combination in order to simplify, enable, or optimize interference cancelation (IC) or interference suppression (IS) in the UE receiver. The network assistance information may be referred to as "IC/IS side info", and the (1) Modulation order and (2) Pre-coder info (e.g., codebook, #TX, #layers, PMI) of an interfering signal may be part of the IC/IS side information to be provided to a UE. For instance: with such IC/IS side info, a (near) maximum likelihood detector in the UE which detects resource blocks 202 (FIG. 2) will (ideally) be capable of also demodulating the interfering (UE allocation's RBs 204) signal which is falling in the allocated resource blocks of the desired UE enabling an ideally complete elimination of the UE allocation's signal (RBs 204) improving DL throughput of the UE in the serving cell 201. With respect to the inter-cell co-channel interference case in all deployment scenarios and in particular in the homogeneous macro network, appropriate/efficient method(s) for signaling IC/IS side information to the LTE UE for the general inter-cell co-channel interference case may need to be addressed: in particular methods meeting the signaling requirements, minimizing changes to the LTE standard and/or UE receiver implementation, and optimizing network assistance.

Some embodiments disclosed herein address minimization of the amount of IC/IS side information and in some embodiments, minimizing the amount of resources required for providing network assistance information. Embodiments disclosed herein provide several methods to reduce the amount of side-information that has to be signaled for a network-assisted interference cancellation and/or suppression receiver. The minimization of signaling is not just an optimization of a potential NA-ICS scheme but may be considered a requirement given the very limited available signaling bandwidth and the vast amount of interfering transmission schemes that may be used and would have to be signaled. In a naïve implementation, the entire information that is sent via PDCCH would need to be also made available to the interfered UE.

In accordance with embodiments, a signaling method to minimize NA-ICS side information is provided. Depending on the kind of signaling method used, either the serving eNB or each interfering eNB might signal the NA-ICS side information to the UE.

In the first part of this section, an overview of the possible transmission options in LTE and explain why the signaling overhead should be minimized. The second part discloses several embodiments which may achieve a significant signaling reduction.

Possible Transmission Configurations Per Interfering Signal: Depending on the transmission mode in the interfering cell and its configuration, the effective channel may be estimated directly from precoded demodulation reference symbols or has to be computed from an estimate of the interfering channel (derived from cell-specific reference symbols) and the precoding that has to be explicitly signaled. In any case, the modulation alphabet (i.e., QPSK, 16QAM, or 64QAM) of a single transport block or the modulation scheme pair for two transport blocks has to be signaled explicitly. The number of transmit antenna ports (as applicable to transmission modes 1-6) used by an interferer as well as the cell id may be derived by the UE or is signaled (semi) statically.

The following table (Table 1) provides overview per transmission mode used by the interfering cell. In the last column of the table, the number of possible configuration options is listed. The numbers are primarily meant to illustrate the range of possible configuration options rather than the exact number as for some transmissions modes this depends on further assumptions.

TABLE 1

Overview of Transmission Modes and IC/IS Signaling Requirements

| TM | Description of Transmission Mode | Combinations to consider | Number of Options |
|---|---|---|---|
| TM 1 | For this single antenna transmission mode, no precoding is applied, so only the modulation alphabet needs | Need to signal 3 different modulations. | 3 |

TABLE 1-continued

Overview of Transmission Modes and IC/IS Signaling Requirements

| TM | Description of Transmission Mode | Combinations to consider | Number of Options |
|---|---|---|---|
| | to be signaled. Channel estimation is performed using the cell-specific reference signals (CRS). | | |
| TM 2/ SFBC | For the SFBC transmit diversity scheme configured by TM2 and available as fallback in other transmission modes, the UE needs to know whether 2 or 4 Tx antennas are used (already signaled or determined in advance, see above) and only requires explicit signaling of the used modulation scheme. Channel estimation is performed using the CRS. | Need to signal 3 different modulations. | 3 |
| TM 3 | For the CDD open-loop spatial multiplexing MIMO mode, the precoder deterministically depends on the number of Tx antennas, the rank, and the subcarrier/RE number (see 3GPP TS 36.211, 6.3.4.2.2). Besides the modulation scheme, the transmission rank has to be signaled (DCI Format 2A). Channel estimation is performed using the CRS. Note: Which of the 16 possible open loop CDD precoder elements (W(i) * D(i) * U) has been used for the start resource element (RE) within a Physical Resource Block (PRB) depends on the position of the PRB within the interfering UE's TB allocation as well as on the amount of REs unusable for PDSCH to RE mapping. The open-loop CDD precoder element may be blindly detected on the start RE. | Rank 1: 3 different modulations Rank 2-4: 3 × 3 modulation combinations for two different transport blocks, i.e. 3 × 3 × 3 = 27 | 30 |
| TM 4 | For the closed-loop spatial multiplexing transmission, the precoder is selected from a predefined codebook (see 3GPP TS 36.211, 6.3.4.2.3) where the precoding matrix depends on the precoding matrix indicator (PM I) and the rank. For 2 Tx antennas and ranks up to 2, 6 = 4 + 2 different precoders are available and for 4 Tx antennas and ranks up to 4, 64 = 16 × 4 are available and have to be signaled. In addition to that, the modulation scheme needs to be signaled. Channel estimation is performed using the CRS. | 2 Tx antenna case is a subset of 4 antenna case. Rank 1: 16 PMIs × 3 modulations: 48 Rank 2-4: 16 PMIs per rank, 3 × 3 modulation combinations, 3 different ranks: 16 × 3 × 3 × 3 = 432 | 480 |
| TM 5 | This is the MU-MIMO transmission mode introduced in Rel-8. It supports rank-1 transmissions per user with 4 or 16 different precoding vectors from the TM4 codebook as indicated by the PM Is. It is still necessary to distinguish TM5 from TM4 though because usually a −3 dB power offset is applied to each transmission to split the available Tx power between the two simultaneously served users. In addition to that, the modulation scheme needs to be signaled. Channel estimation is performed using the CRS. | Only rank 1 transmissions: 16 PMIs times 3 modulations | 48 |
| TM 6 | This transmission is a subset of TM4 restricted to a single layer (i.e., rank 1). For the interfered UE it appears as a rank 1 TM4 transmission so that no special IC/IS signaling is needed. | Included in TM4 | 0 |

TABLE 1-continued

Overview of Transmission Modes and IC/IS Signaling Requirements

| TM | Description of Transmission Mode | Combinations to consider | Number of Options |
|---|---|---|---|
| TM 7 | This TM allows non-codebook based precoding transmitting only a single stream. Reference signals are derived from user-specific sequence (C-RNTI dependent, see 6.10.3.1 in 36.211) which cannot be used by the interfered NA IC/IS receiver to estimate the effective channel unless the RNTI would also be signaled. | Not feasible to support for NA-ICS | 0 |
| TM 8, 9, 10 | These transmission modes rely on UE-specific precoded demodulation reference signals (DM-RS) which the interfered NA IC/IS receiver can use to estimate the effective channels directly. Thus, only the modulation scheme and the number of layers have to be signaled to the UE together with some scrambling related info as described in Table 5.3.3.1.5C-1 in 36.212. In case of TM 10, DMRS scrambling may be initialized with different Virtual Cell IDs in order to enable the creation of Physical Cell ID-independent "areas" for CoMP. The transmission points (TPs) in certain areas may be limited - say e.g. to a set of a few VCIDs - | Explicit signaling: Combinations of 1-2 layers supporting MU-MIMO: Ports 7 and 8 with scrambling 0 and 1: 3 × 3 × 3 × 3: 4 MU-MIMO layers 2 × 3 × 3 × 3: 3 MU-MIMO layers, (2 choices for scrambling config) 4 × 3 × 3: 2 MU-MIMO layers, (4 choices for scrambling) 3 × 3: 1 user, 2 layers 3: 1 user, 1 layer More than 3 layers Ports 7-9: 3 × 3 modulations Ports 7-10: 3 × 3 modulations | 237 |
| | such that the set of VCID values may be communicated as higher layer network assistance information. | Ports 7-11: 3 × 3 modulations Ports 7-12: 3 × 3 modulations Ports 7-13: 3 × 3 modulations Ports 7-14: 3 × 3 modulations Signaling that aids the DM-RS based modulation signaling with (see other ID): (e.g.) Number of layers present Scrambling ID 1 | 12 |

SFBC transmission is available as fallback in almost all other transmission modes. Embodiments disclosed herein do not need to differentiate between fallback/non-fallback operations in other transmission modes because a SFBC/TM2 may be signaled to indicate fallback operation.

From the above overview, for an LTE Rel-1 1 system about 800 different transmission options would need to be distinguished for signaling NA-ICS side info to a UE. A suitable message would thus need 10 bits and would only be valid for the transmissions from one eNodeB on one PRB and TTI. A single eNodeB would thus have to provide up to 100×10=10 kBit of signaling information for transmissions on 100 PRBs (20 MHz system bandwidth) per 1 ms TTI leading to a signaling data rate of 10 Mbit/s. A NA-ICS capable UE might want to suppress multiple interfering eNodeBs so that the required signaling rates would scale further. Clearly, such high signaling rates would be prohibitive or at least severely limit the potential performance gains.

Methods for Minimizing the Amount of Required Signaling Information: The basis for the following methods is the existence of a master codebook that includes all potential interfering transmission configurations as exemplified in the table above (and potentially more).

Method A: Reducing the Number of Transmission Options by Introducing a Smaller Signaling Codebook:

While there is a huge amount of different transmission possibilities in LTE, only a subset of them will be used in an actual system. This motivates restricting the amount of information that is exchanged on a per-TTI basis to the subset of possibilities that is most relevant for a longer period of time (e.g. seconds (thousands of TTIs) or even longer). A master codebook that contains, for example, all of the more than 800 transmission options shown in the table above may be provided. The entries in such a codebook may be encoded with 10 bits or even more. A much smaller signaling codebook that allows distinguishing the most relevant interfering transmission options from the larger master codebook may be provided. Such a codebook could have a size as small as 8 (3 bits) or 16 (4 bits) entries and would thus significantly limit the amount of information that has to be signaled on a per TTI basis. The signaling codebook may be built semi-statically based on higher layer signaling between the eNodeB and the UE, for example when it registers in the system or initiates high data rate transmissions for which NA-ICS support would be beneficial. The higher-layer signaling would require the eNodeB to communicate which entries in the smaller signaling codebook would be filled (i.e. associated) with which entries from the master codebook. For example, in the case of a 16 entries signaling codebook, 16*10=160 Bits would be required to signal the complete codebook or 4+10=14 Bits would be sufficient to update a single entry in the signaling codebook.

With only a few bits necessary to update an entry of the signaling codebook, the eNB could also adapt the signaling codebook within shorter time frames (e.g., on the order of 50 to 1000 TTIs) to reflect the current scheduling situation. For example, based on the downlink traffic situation, the eNB serving a user in the interfering cell could predict that this user will be scheduled during the immediate future and it is likely that only a single or at least only a very limited number of transmission configurations will be used (e.g., just a single transmission mode, same number of layers, same modulation scheme, etc.). In that case, this transmission configuration may be added to the signaling codebook dynamically.

The signaling codebook can also contain a default entry (e.g. 0) which simply indicates that none of the previously exchanged options is applicable so that the UE has to operate without NA-ICS support.

As mentioned above, embodiments disclosed herein are directed to reducing the NA-ICS signaling message. The envisioned signaling codebook may be built using (higher layer) RRC signaling between a UE and its serving eNB. The short term per-TTI signaling using this reduced codebook could then be realized with DCI indication from the serving eNB to the interfered UE. Especially for the short-term signaling, however, different signaling mechanisms that do not rely on an extension of the DCI signaling are feasible. For example, the short-term signaling could either be provided by the serving eNB using a non-DCI message, or it could come from the interfering eNBs directly.

There are many reasons why a much smaller signaling codebook may be sufficient to capture the most important out of the many transmission options shown in the table:

- The interfering eNodeBs might have hardware limitations (e.g. only 2 Tx antennas) that permanently exclude a large amount of options. For example, all options with ranks>2 would not be possible.
- The interfering eNodeBs are configured to operate only with certain transmission schemes or even do not support them based on their hardware or firmware implementation.
- The typical propagation conditions in the interfering cell could, for example, in the case of a high percentage of line-of-sight transmissions, make the use of more than, e.g., 2 transmission layers very rare.
- Some interfering transmission options may be unsuitable candidates for NA-ICS operation, for example (hypothetically), a UE might not gain from the knowledge that the interferer has 4 layer transmissions with 64QAM, because such a transmission is already quite similar to AWGN (AWGN corresponds to an infinite number of layers or other kinds of transmissions, higher order modulation also gets closer to AWGN).
- With the codebook-based precoding (in TM4) the eNodeB can apply a codebook subset restriction so that certain PMIs will never be used in the cell.
- Some of the theoretically feasible transmission options in LTE may be very rare, for example, operation with CDD open-loop MIMO in TM3 where the modulation on the two transport blocks is (very) different.
- Some LTE transmission modes might never be used in practice because they are optional (e.g. TM5) or would only be used in a malfunctioning system (e.g., TM1 with an eNB equipped with two antennas).

Method B: Establishing Higher-Layer Feedback from the UE to the eNodeB to Inform about Certain NA-ICS Capabilities The signaling codebook approach mentioned in Method A may be extended by including feedback from the UE, i.e., by introducing a hand-shake where the UE indicates use cases where NA-ICS would be either very beneficial or not beneficial at all based on the implemented NA-ICS receiver in the UE. This way, the eNodeB can restrict the signaling only to those use cases that are most promising to help the UE receiver. For example (hypothetically), a specific UE receiver implementation might not be able to gain from the knowledge that the interference is modulated with 64QAM or that it is using DM-RS based transmission, or it cannot cancel more than a maximum number of layers.

Method C: Reducing the Number of Signaling Options by Providing Only Certain a Priori Information The UE receiver may be able to blindly detect the presence and structure of certain interfering transmissions. For example, with intra or inter-cell DM-RS based interference, the UE may be able to detect the presence of interfering layers autonomously and might thus only be interested in information about the modulation scheme. Or, as another example, the UE receiver may be very powerful and be able to autonomously detect most of the interfering transmission's structure but would need a prohibitive amount of time or computational resources and power to do so. To accommodate such cases, some embodiments may augment the master codebook of all possible transmission options to include also classes of transmission options that, by signaling those via the signaling codebook, provide the UE helpful a priori side information. As an example, the master code book could then contain entries for transmission Schemes, for example:

SFBC
Codebook-based precoding
CDD open loop precoding
DM-RS based transmission o DM-RS based multiuser
DM-RS based CoMP
Only the modulation of one transport block
The modulation combination of two transport blocks The provision of side information can, in addition or separately, also be done by providing transmission statistics to the UE. For example, if the eNodeB semi-statically provides a histogram of how frequently different transmission modes are used in the cell, the UE can align its blind-decoding strategy by testing transmission hypotheses in order of the signaled likelihood. The histogram information may be provided with more or less quantization detail (e.g. down to single % or coarse bins like "Top 5%", "Top 10%", "Top 35%", "Rest"). Such statistical side-information may be provided instead of short-term signaling (thus saving the short term signaling altogether) or as backup information to help the UE in blind decoding if a specific transmission option is not contained in the current signaling codebook.

Method D: Exploiting Correlations in the Time and Frequency Domain for Reducing the Signaling Message:

The allocation of interfering transmissions can change per PRB and per TTI as the schedulers in the interfering cells are free to schedule their users in the way they want. However, most often there are dependencies in the time and frequency domain because an interfering user is most often allocated more than 1 PRB, e.g., because depending on the resource allocation type used, PRBs have to be allocated in resource block groups. All PRBs belonging to one user in a considered TTI are required by the LTE standard to exhibit the same number of layers and the same modulation schemes per layer. In addition, the precoding may be different between different PRBs but as the CSI (PMI) feedback upon which the eNodeB selects the downlink precoder (in an FDD system) is only subband specific and thus the same for multiple adjacent PRBs, also the precoder for adjacent PRBs will often be identical (in fact, for TM9 and TM10 relying on frequency domain PMI/RI reporting, the precoding has to be identical for groups of adjacent PRBs, see 7.1.6.5 "PRB Bundling" in 36.2 13). In addition, the PRBs for the transmission to one user cannot be distributed in an arbitrary fashion over the frequency range. On the one hand, the downlink control information only allows to signal certain allocation types (e.g. resource block groups) and, on the other hand, the CQI feedback can again only be subband specific so that a scheduler would often allocate (groups of) adjacent PRBs.

Thus, the NA-ICS feedback message may be designed to only differentially encode the status of adjacent PRBs. One exemplary realization for the signaling would be to signal for a group of 4 PRBs one entry of the signaling codebook (e.g. 4 bits) and provide a bitmap for which of the 4 PRBs (4 bits) this message is valid. Instead of 4 bits, it may be sufficient to only signal 3 bits, because there is little incentive to indicate a configuration that is relevant for no PRB (one case), or for a single PRB only (4 cases), and it is unlikely that it applies to two non-adjacent PRBs (3 cases: XooX, XoXo, oXoX), leaving 16−1−4−3=8 cases to be signaled with 3 bits. That way, NA-ICS side information may be provided with 7 (or 8) instead of 16 bits for up to 4 PRBs in this example. To enable bigger groups of PRBs where the one NA-ICS signaling information is valid for as many PRBs as possible, the eNodeB scheduler may be forced to schedule compatible groups of PRBs accordingly. However, such scheduling restrictions might lead to system-performance impairments. Another way to reduce signaling would be to exploit correlations in the time domain between TTIs. This may be done in a similar way as before and could, for example, also take semi-persistent scheduling (SPS) configurations into account. Finally, the scheduling in neighboring cells may be forced to be more predictable by the interfered UE so that it would know NA-ICS information already in advance. Again, such a limitation of the scheduling in the system is likely to cause major performance degradation, however.

Method E: Signaling Differential Information in the Time and/or Frequency Domain for Reducing the Signaling Message This is similar to the previous method, but does not rely on an identical configuration in adjacent PRBs, but signals differences. This is beneficial, if the configurations used for two UEs are similar, which may well be the case as the UEs are located in the same cell and may therefore experience similar channels (at least when located in similar areas of the cell), e.g. similar rank of the channel and thus similar number of layers. The configuration of the first UE would be signaled as usual, but for the second UE, only the differences are signaled. In the simplest (and most general case) the two configurations for the two UEs are signaled, and the division, which PRBs are used for one and the other. The latter information may be signaled using a bitmap type signaling as mentioned above, but most likely it is sufficient to give one range (or a couple of ranges) where each UE is scheduled.

Figure 3:
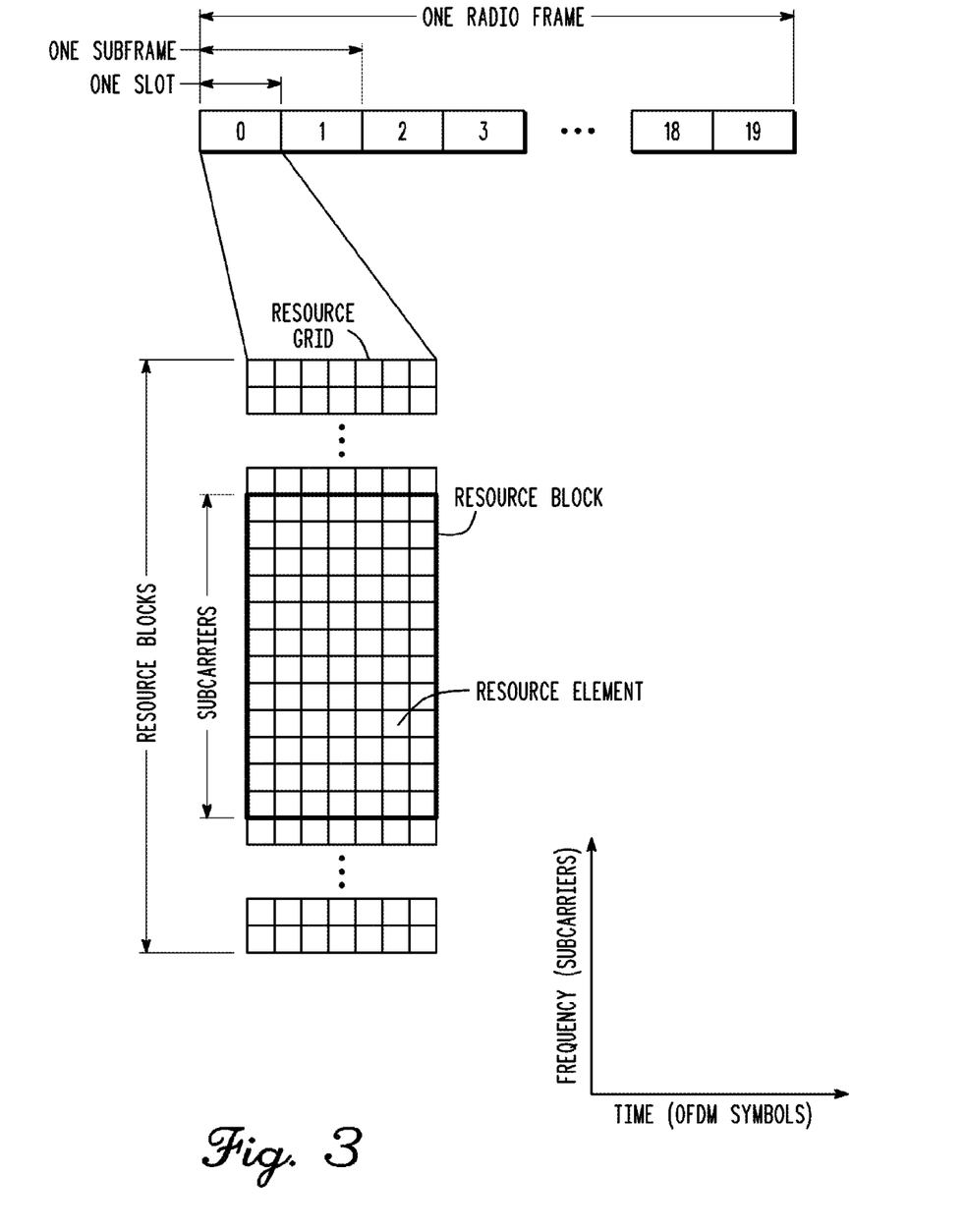
FIG. 3 shows a structure for the downlink resource grid for downlink transmissions from an eNB to a UE in accordance with some embodiments.

FIG. 3 shows a structure for the downlink resource grid for downlink transmissions from an eNB to a UE in accordance with some embodiments. The depicted grid illustrates a time-frequency grid, called a resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements and in the frequency domain which represents the smallest quanta of resources that currently may be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 110 (FIG. 1). The physical downlink control channel (PDCCH) carries information about the transport format and resource allocations related to the PDSCH channel, among other things. It also informs the UE about the transport format, resource allocation, and H-ARQ information related to the uplink shared channel. Typically, downlink scheduling (assigning control and shared channel resource blocks to UEs within a cell) is performed at the eNB based on channel quality information fed back from the UEs to the eNB, and then the downlink resource assignment information is sent to a UE on the control channel (PDCCH) used for (assigned to) the UE.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH may be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 4:
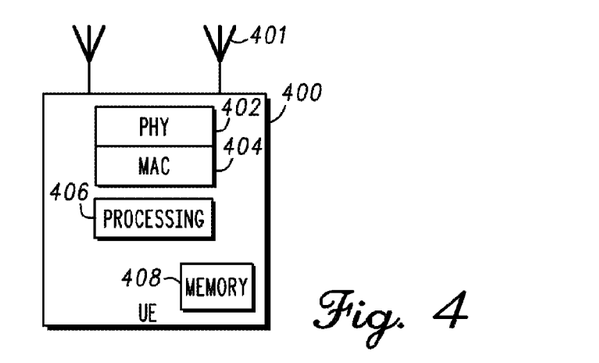
FIG. 4 illustrates a functional block diagram of a UE in accordance with some embodiments.

FIG. 4 illustrates a functional block diagram of a UE in accordance with some embodiments. UE 400 may be suitable for use as UE 110 (FIG. 1). The UE 400 may include physical layer circuitry 402 for transmitting and receiving signals to and from eNBs 104 (FIG. 1) using one or more antennas 401. UE 400 may also include medium access control layer (MAC) circuitry 404 for controlling access to the wireless medium. UE 400 may also include processing circuitry 406 and memory 408 arranged to perform the operations described herein. In accordance with embodiments, the UE 400 may be arranged to receive network-assistance (NA) interference cancellation signaling (ICS) (NA-ICS) side information from an eNB for performing interference mitigation as discussed above.

In some embodiments, the UE 400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 400 may include one or more of a keyboard, a display, a non-volatile memory port, multiple antennas, a graphics processor, an application processor, speakers, and other mobile device elements. The display may be an LCD screen including a touch screen.

The one or more antennas 401 utilized by the UE 400 may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated to take advantage of spatial diversity and the different channel characteristics that may result between each of antennas and the antennas of a transmitting station. In some MIMO embodiments, the antennas may be separated by up to 1/10 of a wavelength or more.

Although the UE 400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage medium, which may be read and executed by at least one processor to perform the operations described herein. A computer-readable storage medium may include any non-transitory mechanism for storing information in a form readable by a machine (e.g., a computer). For example, a computer-readable storage medium may include read-only memory (ROM), random-access memory (RAM), magnetic disk storage media, optical storage media, flash-memory devices, and other storage devices and media. In these embodiments, one or more processors may be configured with the instructions to perform the operations described herein.

In some embodiments, the UE 400 may be configured to receive OFDM communication signals over a multicarrier communication channel in accordance with an OFDMA communication technique. The OFDM signals may comprise a plurality of orthogonal subcarriers. In some broadband multicarrier embodiments, eNBs may be part of a broadband wireless access (BWA) network communication network, such as a Worldwide Interoperability for Microwave Access (WiMAX) communication network or a 3rd Generation Partnership Project (3GPP) Universal Terrestrial Radio Access Network (UTRAN) Long-Term-Evolution (LTE) or a Long-Term-Evolution (LTE) communication network, although the scope of the invention is not limited in this respect. In these broadband multicarrier embodiments, the UE 400 and the eNBs may be configured to communicate in accordance with an orthogonal frequency division multiple access (OFDMA) technique.

In some LTE embodiments, the basic unit of the wireless resource is the Physical Resource Block (PRB). The PRB may comprise 12 sub-carriers in the frequency domain×0.5 ms in the time domain. The PRBs may be allocated in pairs (in the time domain). In these embodiments, the PRB may comprise a plurality of resource elements (REs). A RE may comprise one sub-carrier×one symbol.

Two types of reference signals may be transmitted by an eNB including demodulation reference signals (DM-RS), channel state information reference signals (CIS-RS) and/or a common reference signal (CRS). The DM-RS may be used by the UE for data demodulation. The reference signals may be transmitted in predetermined PRBs.

In some embodiments, the OFDMA technique may be either a frequency domain duplexing (FDD) technique that uses different uplink and downlink spectrum or a time-domain duplexing (TDD) technique that uses the same spectrum for uplink and downlink.

In some other embodiments, the UE 400 and the eNBs may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some LTE embodiments, the UE 400 may calculate several different feedback values which may be used to perform channel adaption for closed-loop spatial multiplexing transmission mode. These feedback values may include a channel-quality indicator (CQI), a rank indicator (RI) and a precoding matrix indicator (PMI). By the CQI, the transmitter selects one of several modulation alphabets and code rate combinations. The RI informs the transmitter about the number of useful transmission layers for the current MIMO channel, and the PMI indicates the codebook index of the precoding matrix (depending on the number of transmit antennas) that is applied at the transmitter. The code rate used by the eNB may be based on the CQI. The PMI may be a vector that is calculated by the UE and reported to the eNB. In some embodiments, the UE may transmit a physical uplink control channel (PUCCH) of format 2, 2a or 2b containing the CQI/PMI or RI.

In these embodiments, the CQI may be an indication of the downlink mobile radio channel quality as experienced by the UE 400. The CQI allows the UE 400 to propose to an eNB an optimum modulation scheme and coding rate to use for a given radio link quality so that the resulting transport block error rate would not exceed a certain value, such as 10%. In some embodiments, the UE may report a wideband CQI value which refers to the channel quality of the system bandwidth. The UE may also report a sub-band CQI value per sub-band of a certain number of resource blocks which may be configured by higher layers. The full set of sub-bands may cover the system bandwidth. In case of spatial multiplexing, a CQI per code word may be reported.

In some embodiments, the PMI may indicate an optimum precoding matrix to be used by the eNB for a given radio condition. The PMI value refers to the codebook table. The network configures the number of resource blocks that are represented by a PMI report. In some embodiments, to cover the system bandwidth, multiple PMI reports may be provided. PMI reports may also be provided for closed loop spatial multiplexing, multi-user MIMO and closed-loop rank 1 precoding MIMO modes.

In some cooperating multipoint (CoMP) embodiments, the network may be configured for joint transmissions to a UE in which two or more cooperating/coordinating points, such as remote-radio heads (RRHs) transmit jointly. In these embodiments, the joint transmissions may be MIMO transmissions and the cooperating points are configured to perform joint beamforming.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of user equipment (UE), the apparatus comprising: memory and processing circuitry configured to:
    encode radio-resource control (RRC) signaling for transmission to an enhanced node B (eNB), the RRC signaling indicating that the UE supports Network Assisted Interference Cancellation Suppression (NAICS);
    decode RRC signaling received from the eNB to determine neighbor cell information for the NAICS, the neighbor cell information including a cell identity (ID) and one or more transmission modes (TMs) of a neighbor cell;
    decode RRC signaling received from the eNB to determine cell specific reference signal (CRS) information for use in performance of the interference mitigation technique;
    decode RRC signaling received from the eNB to determine whether a codebook subset restriction is applicable to transmission modes to be used by the UE; and
    perform an interference mitigation technique to cancel or suppress interference based on the neighbor cell information for NAICS.

2. The apparatus of claim 1 wherein the codebook subset restriction is configured to limit transmission options of the UE, the transmission options limited to reduce co-channel cell interference with the neighbor cell.

3. The apparatus of claim 1 wherein the processing circuitry is further configured to decode RRC signaling received from the eNB to determine whether the codebook subset restriction is applicable to the transmission modes used within the neighbor cell.

4. The apparatus of claim 1 wherein the neighbor cell information for NAICS further includes modulation order and precoder information, and
    wherein the processing circuitry includes maximum likelihood detection circuitry to demodulate interfering signals, based on the modulation order and precoder information, that fall within resource blocks allocated to the UE.

5. The apparatus of claim 1 wherein the RRC signaling received from the eNB to determine the neighbor cell information for NAICS is signaled using a signaling codebook.

6. The apparatus of claim 5 wherein the signaling codebook is a subset of a master signaling codebook.

7. The apparatus of claim 5 wherein subsequent RRC signaling received from the eNB to determine the neighbor cell information for NAICS is signaled differentially with respect to the signaling codebook.

8. The apparatus of claim 5 wherein the one or more transmission modes comprise transmission options including modulation and multiplexing options, transmission rank, and antenna configuration options.

9. The apparatus of claim 8 wherein the one or more transmission modes are transmission modes of a plurality of transmission modes that are defined by the signaling codebook, and
    wherein the transmission options of the one or more transmission modes are defined by a subset of the signaling codebook.

10. The apparatus of claim 1 wherein the RRC signaling for transmission to the eNB to indicate that the UE supports NAICS is transmitted via uplink control information on a physical uplink control channel (PUCCH), and wherein the RRC signaling is received via downlink control information (DCI) on a physical downlink control channel (PDCCH).

11. A non-transitory computer-readable storage medium that stores instructions for execution by processing circuitry of user equipment (UE) to configure the UE to perform operations to:
    encode radio-resource control (RRC) signaling for transmission to an enhanced node B (eNB), the RRC signaling indicating that the UE supports Network Assisted Interference Cancellation/Suppression (NAICS);
    decode RRC signaling received from the eNB to determine neighbor cell information for the NAICS, the neighbor cell information including cell specific reference signal (CRS) information of a neighbor cell;
    decode RRC signaling received from the eNB to determine cell specific reference signal (CRS) information for use in performance of the interference mitigation technique;
    decode RRC signaling received from the eNB to determine whether a codebook subset restriction is applicable to transmission modes to be used by the UE; and
    perform an interference mitigation technique to cancel or suppress interference based on the neighbor cell information for NAICS.

12. The non-transitory computer-readable storage medium of claim 11 wherein the processing circuitry is further configured to decode RRC signaling received from the eNB to determine one or more transmission modes (TMs) of the neighbor cell for use in performance of the interference mitigation technique.

13. The non-transitory computer-readable storage medium of claim 11 wherein the codebook subset restriction is configured to limit transmission options of the UE, the transmission options limited to reduce co-channel cell interference with the neighbor cell.

14. The non-transitory computer-readable storage medium of claim 11 wherein the processing circuitry is further configured to decode RRC signaling received from the eNB to determine whether the codebook subset restriction is applicable to the transmission modes used within the neighbor cell.

15. The non-transitory computer-readable storage medium of claim 11 wherein the RRC signaling received from the eNB to determine the neighbor cell information for NAICS is signaled using a signaling codebook, the signaling codebook is a subset of a master signaling codebook.

16. The non-transitory computer-readable storage medium of claim 15 wherein subsequent RRC signaling received from the eNB to determine the neighbor cell information for NAICS is signaled differentially with respect to the signaling codebook.

17. The non-transitory computer-readable storage medium of claim 11 wherein the neighbor cell information for NAICS further includes modulation order and precoder information, wherein the operations further comprise operations to demodulate interfering signals, based on the modulation order and precoder information, that fall within resource blocks allocated to the UE.

18. An apparatus of an enhanced node B (eNB), the apparatus comprising:
   memory and processing circuitry configured to:
   decode radio-resource control (RRC) signaling received from user equipment (UE), the RRC signaling indicating that the UE supports Network Assisted Interference Cancellation/Suppression (NAICS);
   encode signaling to restrict transmission modes of UE's operating in the neighbor cell to mitigate co-channel interference with the UE; and
   encode RRC signaling for transmission to the UE to indicate neighbor cell information for the NAICS in response to the indication that the UE supports NAICS, the neighbor cell information including a cell identity (ID) and one or more transmission modes (TMs) of a neighbor cell.

19. The apparatus of claim 18, wherein the processing circuitry is further configured to:
   encode signaling for transmission to the UE to restrict transmission modes of the UE to mitigate co-channel interference with UE's operating in the neighbor cell.

20. The apparatus of claim 19 wherein the signaling to restrict the transmission modes of the UE is signaled with a signaling codebook that is a subset of a master signaling codebook.

21. The apparatus of claim 18 wherein the processing circuitry is configured to select the neighbor cell information for NAICS to allow the UE to perform an interference mitigation technique to cancel or suppress interference.

22. The apparatus of claim 18 wherein the processing circuitry is further configured to encode RRC signaling for transmission to the UE to provide cell specific reference signal (CRS) information for use by the UE in performance of the interference mitigation technique.

* * * * *

UNITED STATES PATENT AND TRADEMARK OFFICE
CERTIFICATE OF CORRECTION

PATENT NO. : 9,787,444 B2
APPLICATION NO. : 15/015348
DATED : October 10, 2017
INVENTOR(S) : Ellenbeck et al.

It is certified that error appears in the above-identified patent and that said Letters Patent is hereby corrected as shown below:

On the Title Page

On page 3, in Column 2, under "Other Publications", Line 30, delete "Patentablility" and insert --Patentability-- therefor Signed and Sealed this
Twenty-eighth Day of May, 2019

Andrei Iancu
*Director of the United States Patent and Trademark Office*